July 16, 1957  W. WARNECKE ET AL  2,799,357
GAS FILTER
Filed Dec. 14, 1954
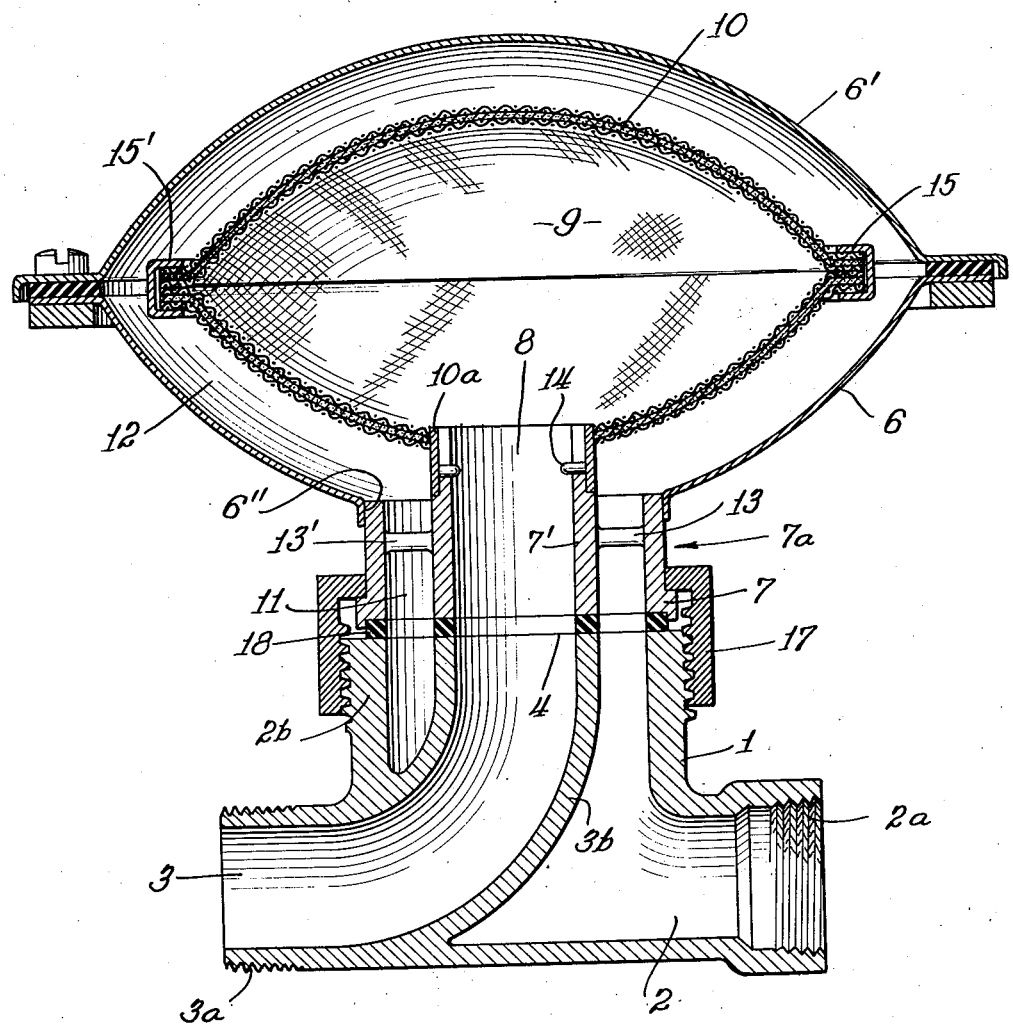
Inventors
Wilhelm Warnecke
and Franz Rings
By Jones, Darbo & Robertson
Attys.

United States Patent Office 2,799,357
Patented July 16, 1957

2,799,357
GAS FILTER

Wilhelm Warnecke, Braunschweig, and Franz Rings, Nahne, near Osnabruck, Germany, assignors to G. Kromschroder Aktiengesellschaft, Osnabruck, Germany Application December 14, 1954, Serial No. 475,056

Claims priority, application Germany December 17, 1953

1 Claim. (Cl. 183—43)

This invention relates to a gas filter in which a filter body is located in a filter housing which is provided with inlet and outlet openings. Gas filters of this type have up to now been connected to the gas pipe by means of two connecting sockets.

It is the object of the invention to provide for such a design of a gas filter that the filter can be more conveniently connected and replaced, and that notwithstanding the local conditions which in many cases do not permit to install the gas piping so as it would be necessary for the connection of the common types of filters.

A further object of the invention is to design a gas filter in such a manner that the housing is capable of enclosing a relative large filter body but nevertheless can be connected to a pipe connecting piece of relative small dimensions. It is a further object of the invention to provide for easy and convenient interchangeability of the filter body without the necessity of dismantling the connection of the pipes and the filter housing.

Still another object of the invention is to construct a gas filter with possibly simple component parts which are cheap in manufacture.

The invention is more fully explained by way of one embodiment illustrated in the drawing.

In the drawing the pipe line adapter 1 is adapted to be connected to a gas pipe (not shown). The pipe adapter 1 has two separate channels 2, 3 which terminate at one end into pipe line connecting snouts 2a and 3a and which open at the other ends into spaced coaxial inner and outer connection tubes 2b and 3b respectively, terminating in a planar sealing face 4.

The gas pipe line adapter is connected at the planar sealing face to filter housing adapter 7a, which is comprised of two tubes concentrically arranged, an outer filter connection tube 7, and an inner filter connection tube 7' which are affixed to each other by bridges 13 and 13' to provide an annular passageway between the two filter connection tubes. One end of each of the filter connection tubes ends in a planar sealing face which is held tightly against the planar sealing face of pipe line adapter 1 by a connecting means 17.

The filter housing is comprised of a body member 6 and a cover member 6' demountably held together to form a hollow enclosure. The body member has a central aperture 6'' which connects with and is supported by the outer connection tube 7 of the filter housing adapter 7a.

A hollow spheroidal filter element 10 is connected at its central aperture 10a to the inner filter connection tube 7' by an easily demountable means such as a bayonet socket.

The filter element 10 is pushed on to the inner filter connection tube 7' and is fastened to it by means of a bayonet catch 14, so that it can be easily released. The filter element 10 is comprised of two shell shaped bodies which are connected with each other at their edge by means of clamps 15, 15'. The housing 6 is closed by means of a cover part 6' which can be easily removed. Thus, after removing the cover part 6', the filter body 10 can be easily replace without the necessity of removing the body member of the filter housing 6 which is secured to the pipe adapter 1 by means of a spigot nut 17. The advantage of the structural set up of the filter is evident. Only one sealing face 4 is provided on which rests a correspondingly shaped sealing ring 18 which seals simultaneously the inner channels 3, 8 and the outer channels 2, 11. Owing to the simple guide way of the gas flow, there are only very unimportant flow of resistances, and it is immaterial in this case, whether the unfiltered gas enters through the channels 2 or 3. The pipe adapter 1 can be turned by 180 degrees, if the gas supply pipe is disposed at the right side, so that also is in this case tube crossings are avoided.

It must be further noted that the diameter and consequently also the effective surface of the filter body 10 is relatively large as compared with the diameter of the filter housing adapter 7a, so that a pipe adapter 1 of small dimensions can be used.

We claim:

A gas filter structure adapted to be used in a gas pipe line, comprising a pipe line adapter having pipe line connecting snouts and spaced co-axial inner and outer connection tubes opening from said adapter, the inner connection tube being connected at one end to one of said snouts and the outer connection tube being connected at one end to the other of said snouts, the other ends of said connection tubes terminating in a planar sealing face, a filter housing adapter comprising mutually supporting spaced co-axial filter connection tubes terminating at one end in a planar sealing face, means for connecting said pipe line adapter and said filter housing adapter at the sealing faces thereof, a filter housing comprising a body member and a cover member together forming a hollow enclosure, said cover member being demountably secured to said body member, said body member having a central aperture therein whereat said body member connects with and is supported by the outer connection tube of said filter housing adapter, a spheroidal hollow filter element within said filter housing and spaced therefrom and having a central aperture therein whereat said element connects with and is supported by the inner connection tube of said filter housing adapter wherein the major diameter of the spheroidal hollow filter element is substantially greater than the diameter of the filter element central aperture, the arrangement being such that said filter element is supported independently of said filter housing and is removable without disconnecting said pipe line adapter and said filter housing adapter.

References Cited in the file of this patent
UNITED STATES PATENTS

| 881,195 | Moughler | Mar. 10, 1908 |
| 1,869,589 | Tischer | Aug. 2, 1932 |

FOREIGN PATENTS

| 219,981 | Great Britain | Aug. 27, 1925 |
| 242,388 | Great Britain | Nov. 12, 1925 |
| 391,927 | Great Britain | May 11, 1933 |